(12) United States Patent
Tomeba et al.

(10) Patent No.: US 11,324,003 B2
(45) Date of Patent: *May 3, 2022

(54) RADIO TRANSMISSION APPARATUS, RADIO RECEPTION APPARATUS, AND COMMUNICATION METHOD

(71) Applicant: Sharp Kabushiki Kaisha, Sakai (JP)

(72) Inventors: Hiromichi Tomeba, Sakai (JP); Takashi Onodera, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/901,030

(22) Filed: Jun. 15, 2020

(65) Prior Publication Data

US 2020/0314847 A1 Oct. 1, 2020

Related U.S. Application Data

(63) Continuation of application No. 16/394,301, filed on Apr. 25, 2019, now Pat. No. 10,721,736, which is a
(Continued)

(30) Foreign Application Priority Data

May 26, 2014 (JP) .................................. 2014-107650

(51) Int. Cl.
*H04W 72/04* (2009.01)
*H04B 7/04* (2017.01)
(Continued)

(52) U.S. Cl.
CPC .......... *H04W 72/0453* (2013.01); *H04B 7/04* (2013.01); *H04J 1/00* (2013.01);
(Continued)

(58) Field of Classification Search
CPC ........... H04W 72/044; H04W 72/0453; H04W 72/00; H04W 72/04; H04W 72/0446;
(Continued)

(56) References Cited

U.S. PATENT DOCUMENTS

2010/0046656 A1* 2/2010 van Nee ................ H04L 5/0023
375/267
2011/0261803 A1* 10/2011 Moorti .................. H04L 5/0048
370/338
(Continued)

OTHER PUBLICATIONS

Tomeba et al., "Radio Transmission Apparatus, Radio Reception Apparatus, and Communication Method", U.S. Appl. No. 16/394,301, filed Apr. 25, 2019.

*Primary Examiner* — Warner Wong
(74) *Attorney, Agent, or Firm* — Keating & Bennett, LLP

(57) ABSTRACT

A radio transmission apparatus selects any one group from a plurality of groups each indicating a combination of a plurality of radio reception apparatuses, notifies at least a plurality of radio reception apparatuses belonging to the selected group of an identification number assigned in advance to the selected group, and allocates transmission data addressed to the radio reception apparatuses belonging to the selected group to each of a plurality of frequency resources based on order of the radio reception apparatuses, which is determined in advance in the selected group.

7 Claims, 13 Drawing Sheets

Related U.S. Application Data continuation of application No. 15/313,567, filed as application No. PCT/JP2015/063613 on May 12, 2015, now Pat. No. 10,299,270.

(51) Int. Cl.
*H04J 1/00* (2006.01)
*H04J 11/00* (2006.01)
*H04L 5/00* (2006.01)
*H04L 47/70* (2022.01)

(52) U.S. Cl.
CPC ............ *H04J 11/00* (2013.01); *H04L 5/0007* (2013.01); *H04L 47/70* (2013.01); *H04L 47/828* (2013.01)

(58) Field of Classification Search
CPC ...... H04W 72/12; H04W 1/0083; H04B 7/02; H04B 7/04; H04L 5/0001; H04L 5/0003; H04L 5/0005; H04L 5/0007; H04L 12/40071; H04L 5/003; H04L 2012/5631; H04L 47/70; H04L 47/78; H04L 47/781; H04L 47/828; H04J 11/00; H04J 2011/0009; H04J 1/00; H04J 1/02; H04J 1/04

See application file for complete search history.

(56) References Cited

U.S. PATENT DOCUMENTS

| | | | | |
|---|---|---|---|---|
| 2013/0315262 | A1* | 11/2013 | Baik | H04L 27/26 370/474 |
| 2014/0307612 | A1* | 10/2014 | Vermani | H04L 5/0044 370/312 |
| 2015/0139089 | A1* | 5/2015 | Azizi | H04W 52/0219 370/329 |
| 2015/0173070 | A1* | 6/2015 | Aboul-Magd | H04W 74/0816 370/329 |
| 2015/0327217 | A1* | 11/2015 | Aboul-Magd | H04W 72/02 370/329 |

* cited by examiner

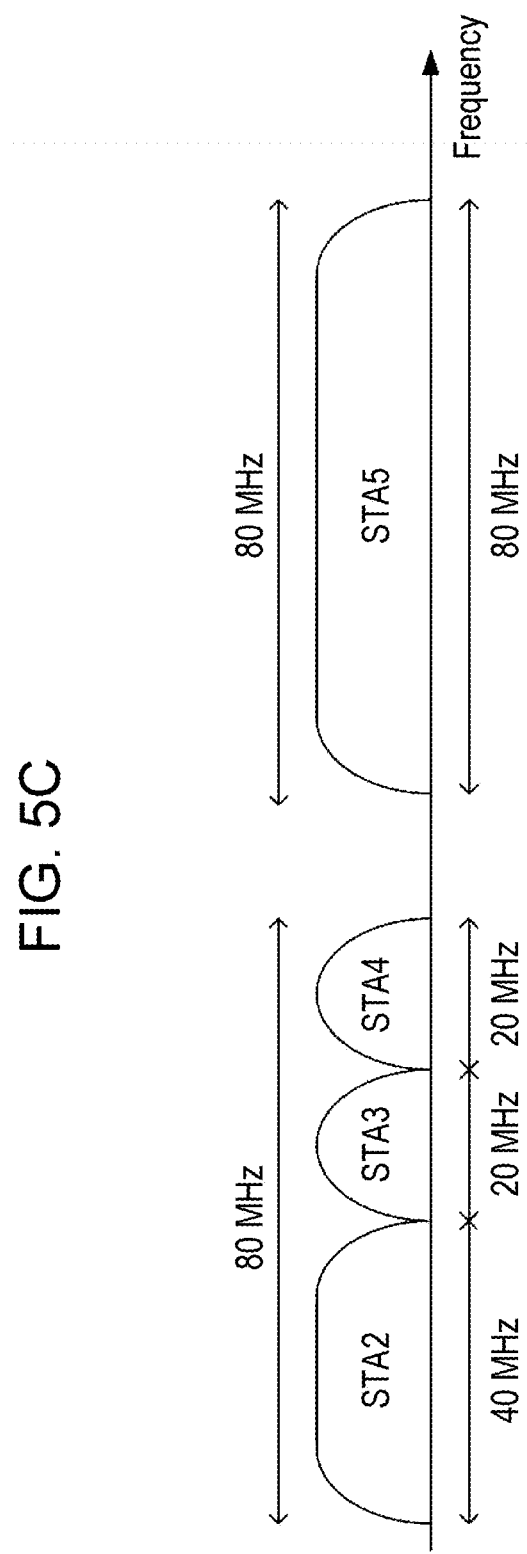

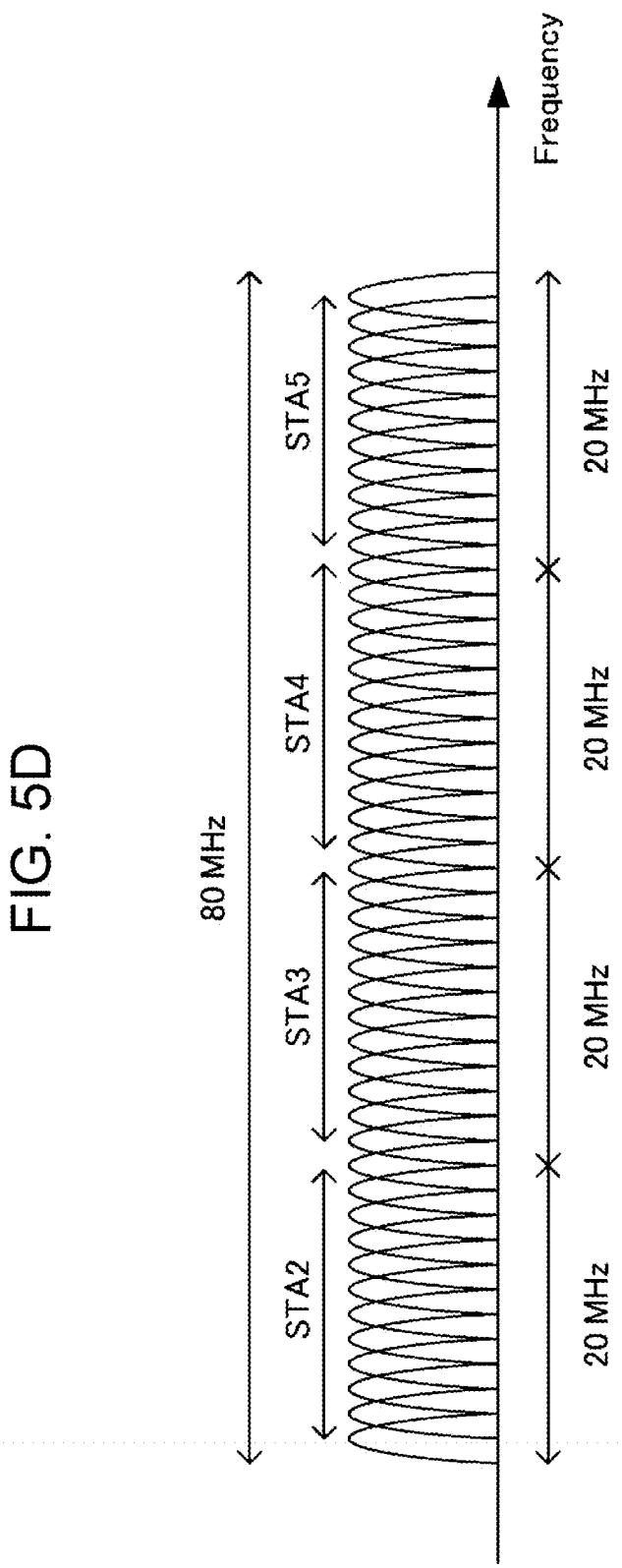

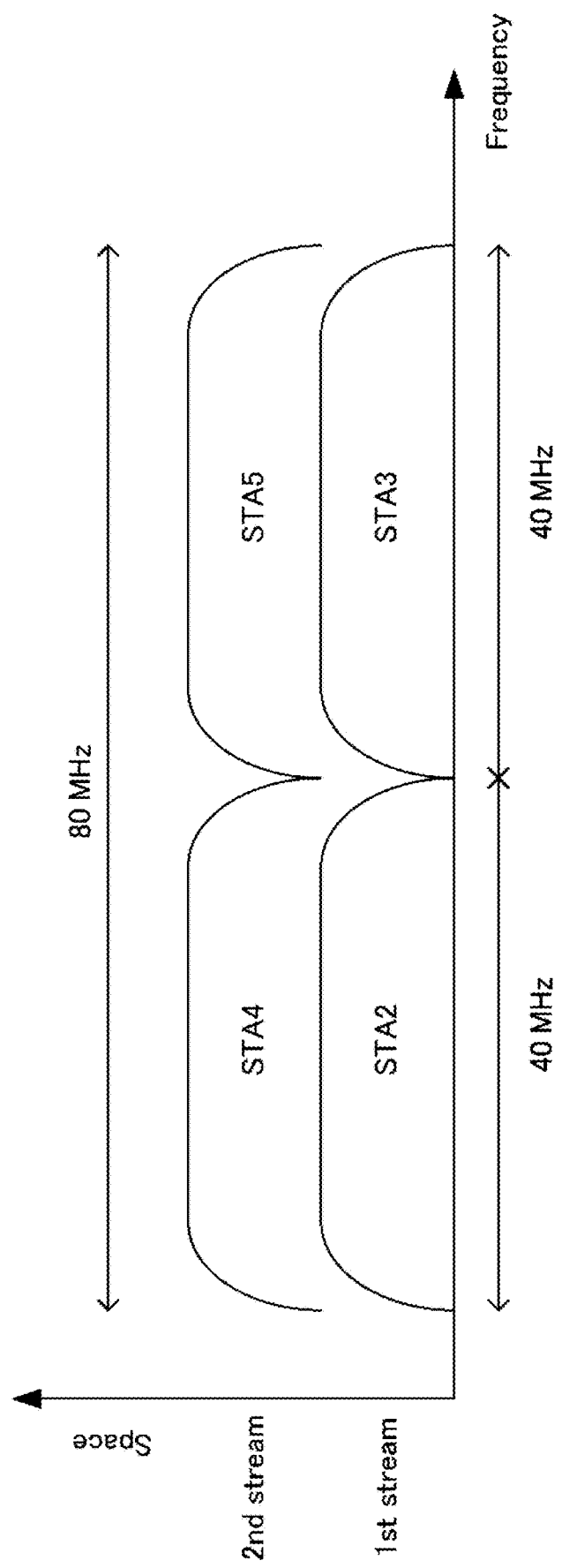

FIG. 6

| Group ID | BELONGING STA |
|---|---|
| 0 | UNUSED |
| 1 | STA2, STA3, STA4, STA5 |
| 2 | STA3, STA2, STA4, STA5 |
| ⋮ | ⋮ |
| 31 | STA6, STA2, STA4, STA8 |
| 32 | STA7, STA8, STA4, STA6 |
| 33 | STA2, STA3, STA8, STA5 |
| ⋮ | ⋮ |
| 62 | STA4, STA5, STA6, STA7 |
| 63 | UNUSED |

US 11,324,003 B2

RADIO TRANSMISSION APPARATUS, RADIO RECEPTION APPARATUS, AND COMMUNICATION METHOD

TECHNICAL FIELD

The present invention relates to a radio transmission apparatus, a radio reception apparatus, and a communication method.

BACKGROUND ART

As an advanced standard of IEEE802.11n which is a radio LAN (Local area network) standard that has been widely put into use, an IEEE802.11ac standard has been developed by the IEEE (The Institute of Electrical and Electronics Engineers, Inc.). Currently, standardization efforts for HEW (High efficiency wireless LAN) are to be conducted as a successive standard of IEEE802.11n/ac. Differently from the past radio LAN standards, not only improvement in peak throughput but also improvement in user throughput are cited as main required conditions in the HEW standard. It is essential to introduce a highly efficient simultaneous multiplexing transmission scheme (access scheme) in order to improve the user throughput.

In standards before the standard of the IEE802.11n, an access scheme of an autonomous distributed control type called CSMA/CA (Carrier sense multiple access with collision avoidance) has been adopted as the access scheme. In the IEEE802.11ac, space division multiple access (SDMA) by a multi-user multiple-input multiple-output (MU-MIMO) technique is newly added.

The HEW standard is required to further improve the access scheme for improving the user throughput. As the highly efficient access scheme, there is Orthogonal Frequency Division Multiple Access (OFDMA). The OFDMA is a scheme for, by using characteristics of Orthogonal Frequency Division Multiplexing (OFDM) which allows enhancement in frequency efficiency by arranging a large number of orthogonal sub-carriers densely at intervals of a reciprocal of a signal duration, allocating any number of sub-carriers (or a frequency band composed of a group of contiguous sub-carriers) with good characteristics to each of radio reception apparatus in accordance with reception characteristics different in the radio reception apparatuses in multipath environments, and thereby further increasing substantial frequency efficiency. It is expected that the user throughput is improved by introducing the OFDMA to the HEW standard (NPL 1).

CITATION LIST

Non Patent Literature

NPL 1: IEEE 11-13/1395r2, "Simultaneous transmission technologies for HEW", November 2013.

SUMMARY OF INVENTION

Technical Problem

However, when the OFDMA is introduced to the radio LAN standard, an access point needs to notify each station connected to the access point of a frequency band (frequency channel or sub-carrier number) to which data addressed to each station is allocated. Newly adding information about notification of the frequency band to control information increases overhead and gives limitation to improvement in the user throughput.

The invention has been made in view of such circumstances, and an object thereof is to provide a radio transmission apparatus, a radio reception apparatus, and a communication method capable of realizing a radio LAN system in which user throughput is improved by introducing OFDMA while suppressing overhead associated with notification of control information.

Solution to Problem

A radio transmission apparatus, a radio reception apparatus, and a communication method according to the invention for solving the aforementioned problems are as follows.

(1) That is, a radio transmission apparatus of the invention is a radio transmission apparatus that multiplexes and simultaneously transmits transmission data addressed to a plurality of radio reception apparatuses by using OFDMA transmission using a plurality of frequency resources, in which any one group is selected from a plurality of groups each indicating a combination of a plurality of radio reception apparatuses, control information including an identification number assigned in advance to the selected group is transmitted to at least a plurality of radio reception apparatuses belonging to the selected group, and transmission data addressed to the plurality of radio reception apparatuses belonging to the selected group is allocated to each of the plurality of frequency resources on the basis of order of the radio reception apparatuses, which is determined in advance in the selected group.

(2) The radio transmission apparatus of the invention is the radio transmission apparatus according to (1), in which the control information further includes information indicating frequency bandwidths of the plurality of frequency resources to be allocated to the transmission data addressed to the plurality of radio reception apparatuses belonging to the selected group.

(3) The radio transmission apparatus of the invention is the radio transmission apparatus according to (1) or (2), in which for each of the plurality of frequency resources to which the transmission data addressed to the plurality of radio reception apparatuses belonging to the selected group is allocated, transmission signals addressed to the radio reception apparatuses are generated.

(4) The radio transmission apparatus of the invention is the radio transmission apparatus according to (1) or (2), in which transmission signals including all the transmission data which is allocated to the plurality of frequency resources and which is addressed to the plurality of radio reception apparatuses belonging to the selected group are collectively generated.

(5) The radio transmission apparatus of the invention is the radio transmission apparatus according to (1), in which a plurality of antennas are further included to correspond to MU-MIMO transmission for multiplexing and simultaneously transmitting transmission data addressed to a plurality of radio reception apparatuses by using a plurality of space resources, in a case where the OFDMA transmission is used, the transmission data addressed to the radio reception apparatuses is allocated to each of the plurality of frequency resources and simultaneously transmitted on the basis of order of the radio reception apparatuses, which is determined in advance in the selected group, and in a case where the MU-MIMO transmission is used, the transmission data addressed to the radio reception apparatuses is allocated to each of the plurality of space resources on the basis of order of the radio reception apparatuses, which is determined in advance in the selected group.

(6) The radio transmission apparatus of the invention is the radio transmission apparatus according to (5), in which the control information further includes information indicating which one the MU-MIMO transmission and the OFDMA transmission is used as a multiplexing scheme.

(7) The radio transmission apparatus of the invention is the radio transmission apparatus according to (5), in which a data modulation scheme applied to at least a part of transmission signals including the control information is determined in accordance with which one of the MU-MIMO transmission and the OFDMA transmission is used as a multiplexing scheme.

(8) The radio transmission apparatus of the invention is the radio transmission apparatus according to (5), in which the control information further includes information indicating frequency bandwidths of the frequency resources to be allocated to each of the transmission data addressed to the plurality of radio reception apparatuses belonging to the selected group, and information indicating the number of the space resources to be allocated to each of the transmission data addressed to the plurality of radio reception apparatuses belonging to the selected group.

(9) The radio transmission apparatus of the invention is the radio transmission apparatus according to (5), in which the control information further includes either information indicating frequency bandwidths of the frequency resources to be allocated to each of the transmission data addressed to the plurality of radio reception apparatuses belonging to the selected group, or information indicating the number of the space resources to be allocated to each of the transmission data addressed to the plurality of radio reception apparatuses belonging to the selected group, and the information indicating the frequency bandwidths of the frequency resources and the information indicating the number of the space resources are described in the same bit field of the control information, which is determined in advance.

(10) The radio transmission apparatus of the invention is the radio transmission apparatus according to (1), in which a plurality of antennas are further included to correspond to MU-MIMO transmission for multiplexing and simultaneously transmitting transmission data addressed to a plurality of radio reception apparatuses by using a plurality of space resources, the control information further includes information indicating frequency bandwidths of the frequency resources to be allocated to each of the transmission data addressed to the plurality of radio reception apparatuses belonging to the selected group, and information indicating the number of the space resources to be allocated to each of the transmission data addressed to the plurality of radio reception apparatuses belonging to the selected group, and the transmission data addressed to the radio reception apparatuses is allocated to each of the plurality of frequency resources and the plurality of space resources on the basis of order of the radio reception apparatuses, which is determined in advance in the selected group, the information indicating the frequency bandwidths of the frequency resources, and the information indicating the number of the space resources.

(11) A radio reception apparatus of the invention is a radio reception apparatus that receives a signal which is transmitted from a radio transmission apparatus and in which transmission data addressed to a plurality of radio reception apparatuses is multiplexed by using OFDMA transmission using a plurality of frequency resources, in which control information including an identification number of a group is acquired from the received signal, whether or not the radio reception apparatus belongs to the group corresponding to the identification number is judged, and in a case where the radio reception apparatus belongs to the group as a result of the determination, a frequency resource allocated to transmission data addressed to the radio reception apparatus is identified from the plurality of frequency resources on the basis of order of the radio reception apparatus, which is determined in advance in the group corresponding to the identification number.

(12) The radio reception apparatus of the invention is the radio reception apparatus according to (11), in which the frequency resource allocated to the transmission data addressed to the radio reception apparatus is identified from the plurality of frequency resources also based on information which is included in the control information and indicates a frequency bandwidth of the frequency resource allocated to the transmission data addressed to the radio reception apparatus.

(13) The radio reception apparatus of the invention is the radio reception apparatus according to (11), in which the radio transmission apparatus further includes a plurality of antennas and corresponds to MU-MIMO transmission for multiplexing and simultaneously transmitting transmission data addressed to a plurality of radio reception apparatuses by using a plurality of space resources, in a case of using the OFDMA transmission, the radio transmission apparatus allocates transmission data addressed to the radio reception apparatuses to each of the plurality of frequency resources for simultaneous transmission on the basis of order of the radio reception apparatuses, which is determined in advance in the selected group, and in a case of using the MU-MIMO transmission, the radio transmission apparatus allocates the transmission data addressed to the radio reception apparatuses to each of the plurality of space resources for simultaneous transmission on the basis of order of the radio reception apparatuses, which is determined in advance in the selected group, the control information includes information indicating which one of the OFDMA transmission and the MU-MIMO transmission the radio transmission apparatus uses as a multiplexing scheme, and the multiplexing scheme used by the radio transmission apparatus is judged on the basis of the control information and a frequency resource or a space resource allocated to the transmission data addressed to the radio reception apparatus is identified.

(14) The radio reception apparatus of the invention is the radio reception apparatus according to (11), in which the radio transmission apparatus further includes a plurality of antennas and corresponds to MU-MIMO transmission for multiplexing and simultaneously transmitting transmission data addressed to a plurality of radio reception apparatuses by using a plurality of space resources, in a case of using the OFDMA transmission, the radio transmission apparatus allocates transmission data addressed to the radio reception apparatuses to each of the plurality of frequency resources for simultaneous transmission on the basis of order of the radio reception apparatuses, which is determined in advance in the selected group, and in a case of using the MU-MIMO transmission, the radio transmission apparatus allocates the transmission data addressed to the radio reception apparatuses to each of the plurality of space resources for simultaneous transmission on the basis of order of the radio reception apparatuses, which is determined in advance in the selected group, a data modulation scheme applied by the radio transmission apparatus to a part of transmission signals including the control information is determined in accordance with which one of the OFDMA transmission and the MU-MIMO transmission the radio transmission apparatus uses as a multiplexing scheme, and the multiplexing scheme used by the radio transmission apparatus is judged on the basis of a data modulation scheme of at least a part of the received signal including the control information, and a frequency resource or a space resource allocated to the transmission data addressed to the radio reception apparatus is identified.

(15) The radio reception apparatus of the invention is the radio reception apparatus according to (13) or (14), in which the control information further includes information indicating frequency bandwidths of the frequency resources to be allocated to the transmission data addressed to the plurality of radio reception apparatuses by the radio transmission apparatus, and information indicating the number of the space resources to be allocated to the transmission data addressed to the plurality of radio reception apparatuses by the radio transmission apparatus, and the transmission data addressed to the radio reception apparatus is demodulated by the transmission signals on the basis of at least one of the information indicating the frequency bandwidths of the frequency resources and the information indicating the number of the space resources.

(16) The radio reception apparatus of the invention is the radio reception apparatus according to (13) or (14), in which the control information includes either information indicating frequency bandwidths of the frequency resources to be allocated to the transmission data addressed to the plurality of radio reception apparatuses by the radio transmission apparatus, or information indicating the number of the space resources to be allocated to the transmission data addressed to the plurality of radio reception apparatuses by the radio transmission apparatus, the information indicating the frequency bandwidths of the frequency resources and the information indicating the number of the space resources are described in the same bit field of the control information, which is determined in advance, and the frequency bandwidths of the frequency resources or the number of the plurality of space resources is acquired from the information which is described in the bit field, on the basis of the multiplexing scheme used by the radio transmission apparatus.

(17) The radio reception apparatus of the invention is the radio reception apparatus according to (11), in which the radio transmission apparatus further includes a plurality of antennas and is able to multiplex and simultaneously transmit the transmission data addressed to the plurality of radio reception apparatuses on the basis of multiplexing transmission simultaneously using MU-MIMO transmission using a plurality of space resources and the OFDMA transmission, the control information further includes information indicating frequency bandwidths of the frequency resources to be allocated to each of the transmission data addressed to the plurality of radio reception apparatuses belonging to the selected group by the radio transmission apparatus, and information indicating the number of the space resources to be allocated to each of the transmission data addressed to the plurality of radio reception apparatuses belonging to the selected group, and the frequency resource and the space resource to which the transmission data addressed to the radio reception apparatus is allocated are acquired on the basis of order of the radio reception apparatuses, which is determined in advance in the selected group, the information indicating the frequency bandwidths of the frequency resources, and the information indicating the number of the space resources.

(18) A communication method of the invention is a communication method of a radio transmission apparatus that multiplexes and simultaneously transmits transmission data addressed to a plurality of radio reception apparatuses on the basis of OFDMA transmission using a plurality of frequency resources, the communication method includes the steps of: selecting any one group from a plurality of groups each indicating a combination of a plurality of radio reception apparatuses; transmitting a control signal including an identification number assigned in advance to the selected group to at least a plurality of radio reception apparatuses belonging to the selected group; and allocating transmission data addressed to the plurality of radio reception apparatuses belonging to the selected group to each of the plurality of frequency resources on the basis of order of the radio reception apparatuses, which is determined in advance in the selected group.

(19) A communication method of the invention is a communication method of a radio reception apparatus that receives a signal which is transmitted from a radio transmission apparatus and in which transmission data addressed to a plurality of radio reception apparatuses is multiplexed by using OFDMA transmission using a plurality of frequency resources, the communication method includes the steps of: acquiring control information including an identification number of a group from the received signal; judging whether or not the radio reception apparatus belongs to the group corresponding to the identification number; and identifying, in a case where the radio reception apparatus belongs to the group as a result of the determination, a frequency resource allocated to transmission data addressed to the radio reception apparatus from the plurality of frequency resources on the basis of order of the radio reception apparatus, which is determined in advance in the group corresponding to the identification number.

Advantageous Effects of Invention

According to the invention, it is possible to realize a radio LAN system in which user throughput is improved by introducing OFDMA while suppressing overhead associated with notification of control information, thus making it possible to greatly improve the user throughput.

BRIEF DESCRIPTION OF DRAWINGS

FIG. 5C illustrates an example of frequency allocation according to the first embodiment of the invention.

FIG. 5D illustrates an example of frequency allocation according to the first embodiment of the invention.

FIG. 5E illustrates an example of frequency allocation according to a third embodiment of the invention.

FIG. 6 illustrates an example of description of a Group ID of the invention.

DESCRIPTION OF EMBODIMENTS

1. First Embodiment

A communication system in the present embodiment includes a radio transmission apparatus (access point (AP)) and a plurality of radio reception apparatuses (stations (STAs)).

Figure 1:
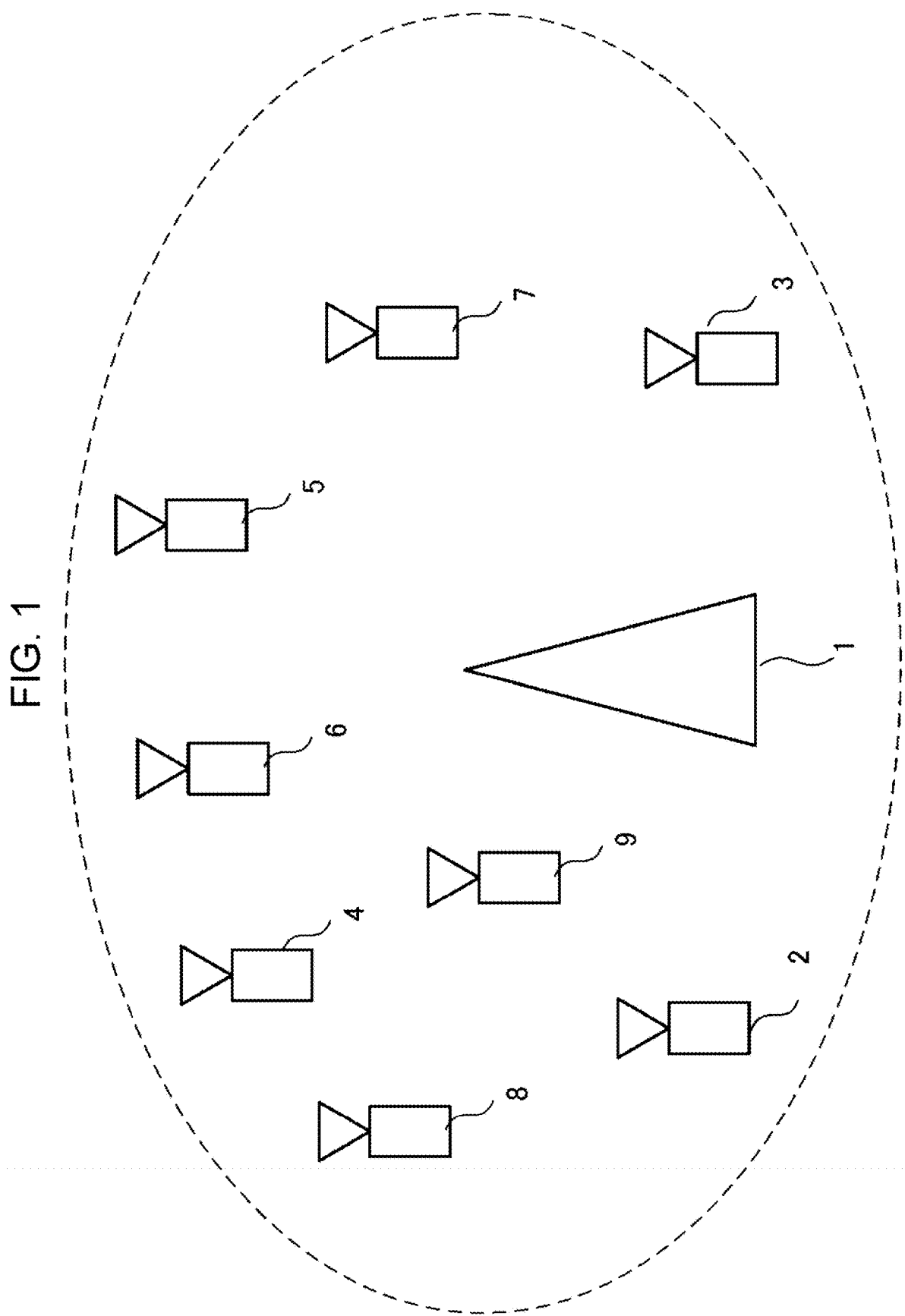
FIG. 1 illustrates an example of a communication system according to the invention.

FIG. 1 is a schematic view illustrating an example of downlink of the communication system according to a first embodiment of the invention. In the communication system of FIG. 1, there are an AP 1, and a STA 2 to a STA 9 which are connected to the AP 1. The AP 1 performs data transmission simultaneously to the STAs by Orthogonal Frequency Division Multiple Access (OFDMA).

Figure 2:
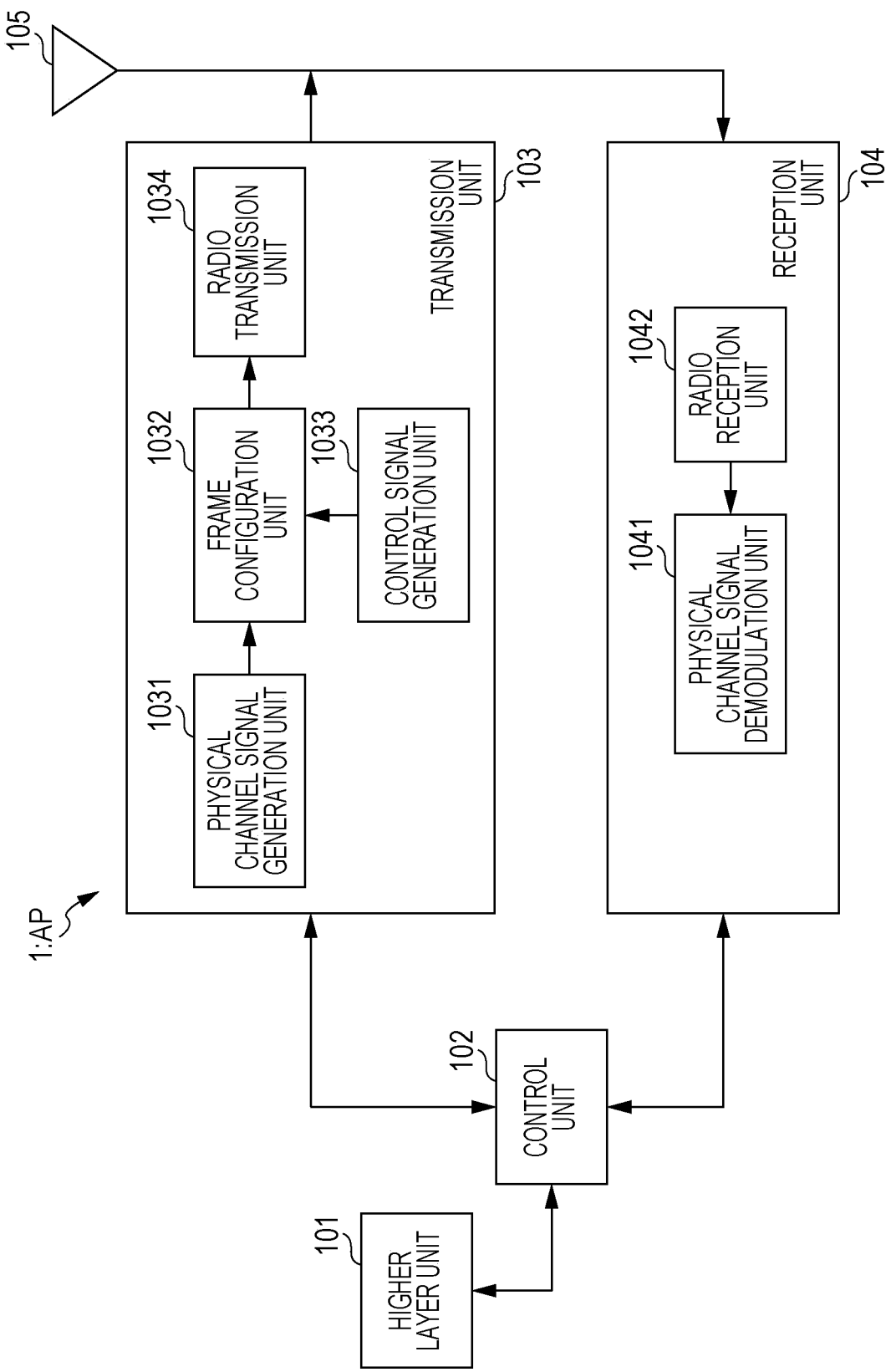
FIG. 2 is a schematic block diagram illustrating a configuration example of a radio transmission apparatus of the invention.

FIG. 2 is a block diagram illustrating an example of a configuration of the AP 1 according to the first embodiment of the invention. As illustrated in FIG. 2, the AP 1 includes a higher layer unit 101, a control unit 102, a transmission unit 103, a reception unit 104, and an antenna 105.

The higher layer unit 101 performs processing in a medium access control (MAC) layer and the like. The higher layer unit 101 generates information for performing control of the transmission unit 103 and the reception unit 104 and outputs the information to the control unit 102. The control unit 102 controls the higher layer unit 101, the transmission unit 103, and the reception unit 104.

The transmission unit 103 further includes a physical channel signal generation unit 1031, a frame configuration unit 1032, a control signal generation unit 1033, and a radio transmission unit 1034. The physical cannel signal generation unit 1031 generates baseband signals to be transmitted by the AP 1 to the STAs. The signals generated by the physical channel signal generation unit 1031 include TFs (Training fields) used by the STAs for channel estimation and data transmitted in a MSDU (MAC service data unit). Note that, an example in which the baseband signals to be transmitted to the STA 2 to the STA 9 are generated is indicated because the number of the STAs is eight in FIG. 1, but the present embodiment is not limited thereto.

Figure 3:
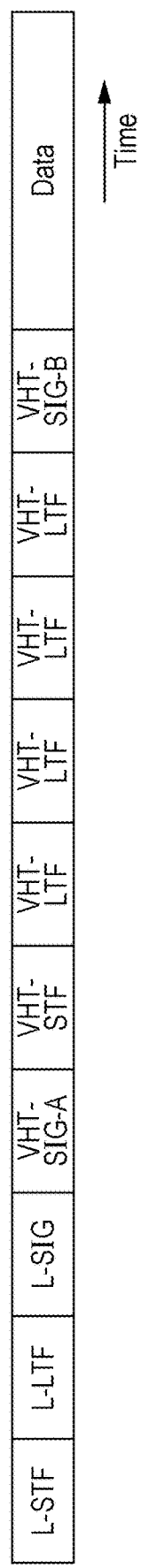
FIG. 3 illustrates an example of a data frame of the invention.

The frame configuration unit 1032 multiplexes a signal generated by the physical channel signal generation unit 1031 and a signal generated by the control signal generation unit 1033, and configures a data frame of the baseband signal actually transmitted by the AP 1. FIG. 3 is a schematic view illustrating an example of the data frame generated by the frame configuration unit 1032 according to the present embodiment. The data frame includes reference signals such as a L-STF (Legacy short training filed), a L-LTF (Legacy long training filed), a VHT-STF (Very high throughput-short training field), and a VHT-LTF (Very high throughput-long training field), control information such as a L-SIG (Legacy-signal), a VHT-SIG-A (Very high throughput-signal-A), and a VHT-SIG-B (Very high throughput-signal-B), and a Data (data) portion. Hereinafter, time intervals in which the reference signals, the control information, and the data portion are transmitted in the data frame are respectively referred to as a preamble channel, a control channel, and a data channel. In the present embodiment, control information generated by the control signal generation unit 1033 will be described below.

The radio transmission unit 1034 performs processing for converting the baseband signals generated by the frame configuration unit 1032 into radio frequency (RF) band signals. The processing performed by the radio transmission unit 1034 includes digital/analog conversion, filtering, frequency conversion from the baseband to the RF band, and the like.

The antenna 105 transmits signals generated by the transmission unit 103 to the STAs.

The AP 1 also has a function of receiving signals transmitted from the STAs. The antenna 105 receives the signals transmitted from the STAs and outputs the signals to the reception unit 104.

The reception unit 104 includes a physical channel signal demodulation unit 1041 and a radio reception unit 1042. The radio reception unit 1042 converts RF band signals input from the antenna 105 to baseband signals. The processing performed by the radio reception unit 1042 includes frequency conversion from the RF band to the baseband, filtering, analog/digital conversion, and the like. The processing performed by the reception unit 104 may include a function (carrier sense) of measuring peripheral interference in a specific frequency band to secure the frequency band.

The physical channel signal demodulation unit 1041 demodulates the baseband signals output by the radio reception unit 1042. The signals demodulated by the physical channel signal demodulation unit 1041 are signals transmitted in uplink by the STA 2 to the STA 9, and have a frame configuration similar to that of the data frame generated by the frame configuration unit 1032. Thus, the physical channel signal demodulation unit 1041 is able to demodulate the uplink data by the data channel on the basis of control information transmitted by the control channel of the data frame. Further, the physical channel signal demodulation unit 1041 may include a carrier sense function.

Figure 4:
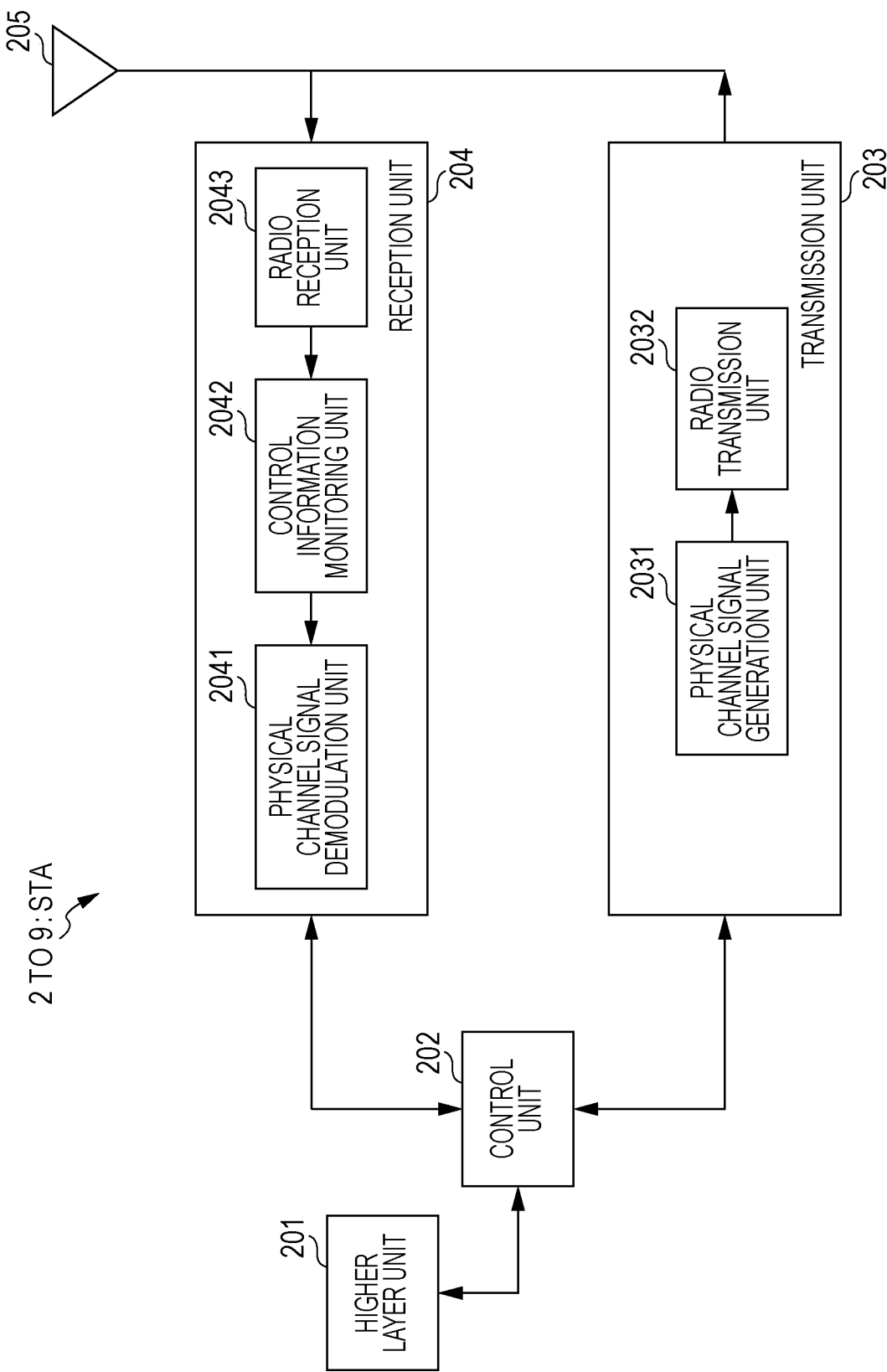
FIG. 4 is a schematic block diagram illustrating a configuration example of a radio reception apparatus of the invention.

FIG. 4 is a block diagram illustrating a configuration example of the STA 2 to the STA 9 according to the present embodiment. As illustrated in FIG. 4, each of the STA 2 to the STA 9 includes a higher layer unit 201, a control unit 202, a transmission unit 203, a reception unit 204, and an antenna 205.

The higher layer unit 201 performs processing of a MAC layer and the like. The higher layer unit 201 generates information for performing control of the transmission unit 203 and the reception unit 204 and outputs the information to the control unit 202.

The antenna 205 receives a signal transmitted by the AP 1 and outputs the signal to the reception unit 204.

The reception unit 204 includes a physical channel signal demodulation unit 2041, a control information monitoring unit 2042, and a radio reception unit 2043. The radio reception unit 2043 converts a RF band signal input from the antenna 205 into a baseband signal. The processing performed by the radio reception unit 2043 includes frequency conversion from the RF band to the baseband, filtering, analog/digital conversion, and the like.

The control information monitoring unit 2042 performs monitoring of the control channel for the baseband signal output by the radio reception unit 2043 and acquires control information to be transmitted by the AP 1 to the STA 2 to the STA 9. The control information includes common control information (for example, VHT-SIG-A) common in the STAs and specific control information (for example, VHT-SIG-B) different for each of the STAs.

The physical channel signal demodulation unit 2041 demodulates the signal of the data channel on the basis of the control information acquired by the control information monitoring unit 2042.

Each of the STA 2 to the STA 9 also has a function of transmitting a signal. The antenna 205 transmits a RF band signal generated by the transmission unit 203 to the base-station apparatus 1.

The transmission unit 203 includes a physical channel signal generation unit 2031 and a radio transmission unit 2032. The physical channel signal generation unit 2031 generates a baseband signal to be transmitted by each of the STA 2 to the STA 9 to the AP 1. The signal generated by the physical channel signal generation unit 2031 has a similar configuration to that of the data frame generated by the frame configuration unit 1032 of the AP 1.

The radio transmission unit 2032 converts the baseband signal generated by the physical channel signal generation unit 2031 into a RF band signal. The processing performed by the radio transmission unit 2032 includes digital/analog conversion, filtering, frequency conversion from the baseband to the RF band, and the like.

Figure 5A:
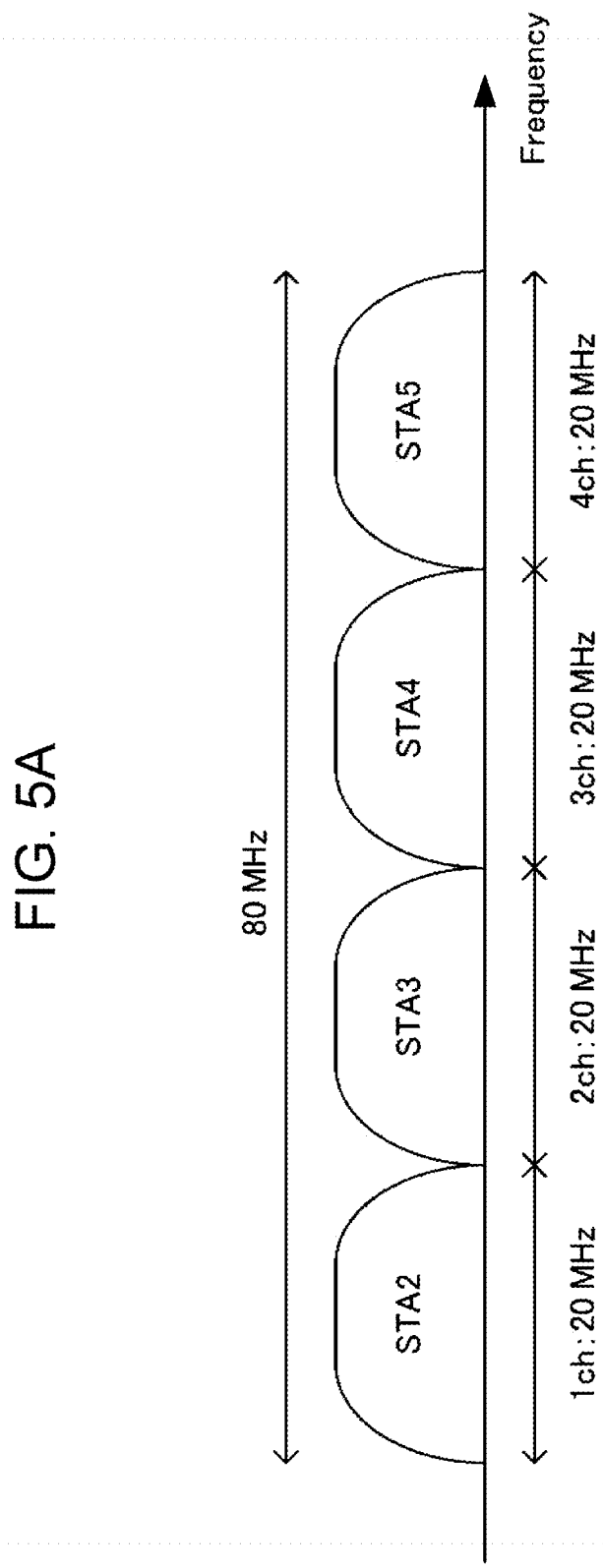
FIG. 5A illustrates an example of frequency allocation according to a first embodiment of the invention.

In the present embodiment, it is considered that the AP 1 performs data transmission by the OFDMA simultaneously to the STA 2 to the STA 9. FIG. 5A is a schematic view illustrating an example of frequency allocation to the STA 2 to the STA 9 according to the present embodiment. It is considered that the AP 1 is able to use a frequency bandwidth of 80 MHz and allocates 20 MHz to each of the STAs. That is, the AP 1 divides the usable frequency bandwidth of 80 MHz into four channels (ch) each having 20 MHz and allocates one STA to each of the channels.

The AP 1 needs to notify the STAs in which frequency band (a sub-carrier, a sub-band as a bundle of a plurality of sub-carriers, or a frequency resource) the data channel is arranged. Thus, the AP 1 according to the present embodiment applies a function called a Group ID adopted by the IEEE802.11ac.

The Group ID used in the IEEE802.11ac is one of common control information included in the VHT-SIG-A transmitted in the control channel by the AP 1 and is an identification number (index) for identifying a group which is decided in advance by the AP 1 and indicates a combination of STAs subjected to spatial multiplexing by the MU-MIMO. By reading the Group ID, each of the STAs is able to judge whether or not the STA participates in the MU-MIMO transmission, and when participating therein, judge in what number of space resource the STA is multiplexed. Here, generally, the AP 1 including N antennas is able to spatially multiplex N STAs or N pieces of data at most, and the space resource refers to a layer or a data stream in which N STAs or N pieces of data that can be spatially multiplexed by the AP 1 are arranged.

Thus, the control signal generation unit 1033 of the AP 1 according to the present embodiment determines a value of the Group ID in accordance with frequency allocation to the STAs. FIG. 6 is a table indicating an example of the Group ID according to the present embodiment. The AP 1 according to the present embodiment determines in advance a group of STAs to be described in the Group ID and shares the content thereof between the AP 1 and each of the STAs in advance. In addition, the AP 1 may change a group of STAs described in the Group ID as appropriate and perform sharing with the STAs each time. The Group ID according to the present embodiment represents an index indicating a combination (group) of STAs participating in OFDMA transmission, which is determined by the AP 1 in advance. An order of STAs described in a field of the belonging STA indicates to which channel each of the STAs is allocated. For example, in FIG. 6, a number 2 of the Group ID indicates that the STA 3, the STA 2, the STA 4, and the STA 5 participate in (are included, belong to) the OFDMA transmission. It is further indicated that the STA 3, the STA 2, the STA 4, and the STA 5 are respectively allocated to the first channel, the second channel, the third channel, and the fourth channel. Thus, when the AP 1 considers frequency allocation to the STAs as illustrated in FIG. 5A, the control signal generation unit 1033 may generate control information for specifying a number 1 as the Group ID.

Figure 7:
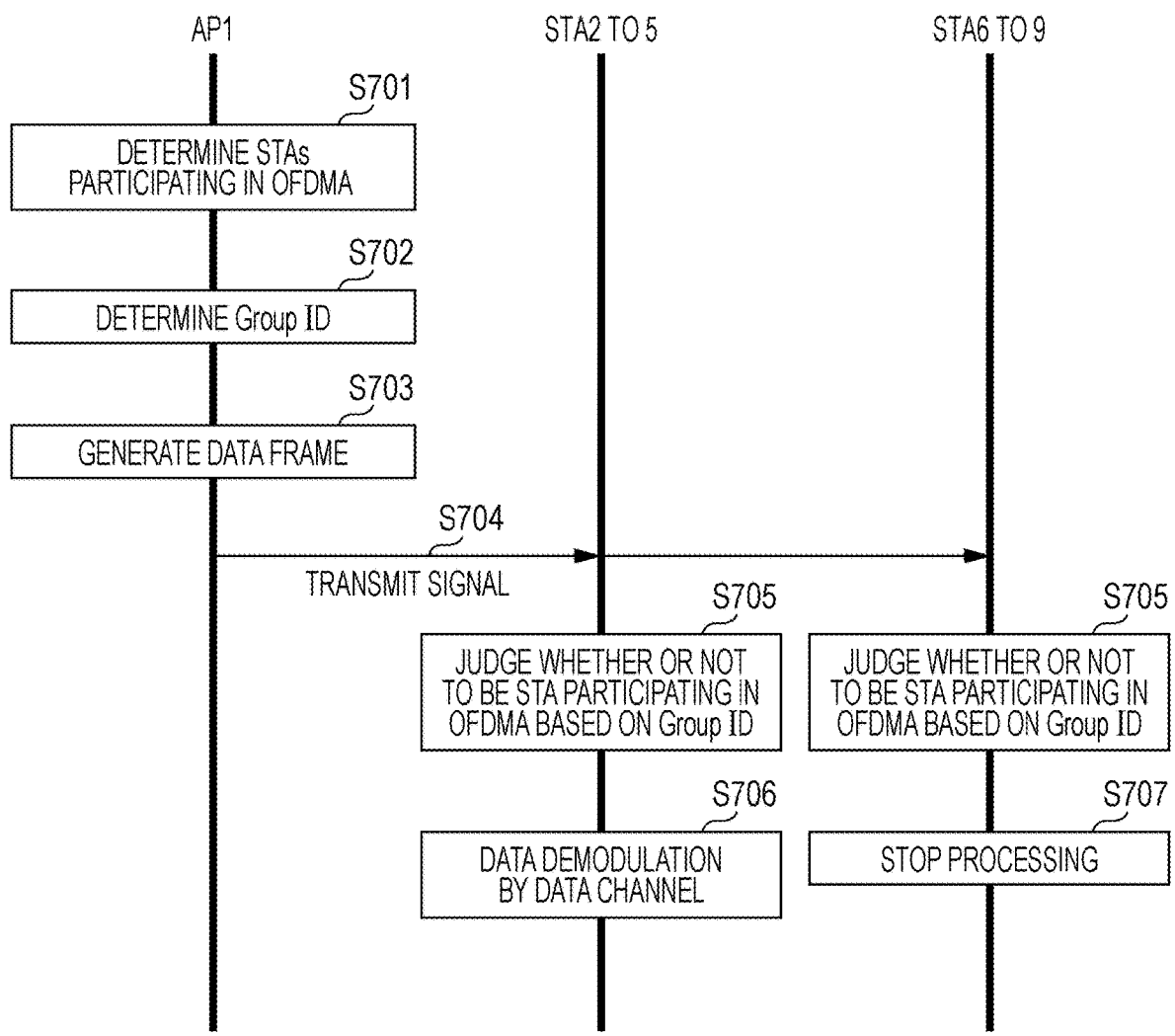
FIG. 7 is a sequence chart illustrating an example of communication according to the first embodiment of the invention.

FIG. 7 is a sequence chart illustrating an example of communication according to the present embodiment. First, the higher layer unit 201 of the AP 1 determines a combination of STAs that participate in the OFDMA transmission (step S701). Note that, in the communication according to the present embodiment, a step of determining a group of STAs to be described in the Group ID, a step of sharing, with the STAs, content of the description of the determined Group ID, and a step of updating the content of the description of the group ID may be provided by the AP 1 before step S701. Then, on the basis of the determination of the higher layer unit 201, the control signal generation unit 1033 determines a value of the Group ID and outputs the value to the frame configuration unit 1032 (step S702). Note that, the higher layer unit 201 may determine a combination of STAs to be multiplexed on the basis of the content of the description of the current Group ID. Next, the frame configuration unit 1032 generates a data frame that includes control information (for example, VHT-SIG-A) including the value of the Group ID generated by the control signal generation unit 1033 (step S703). The radio transmission unit 1034 then generates a transmission signal in a RF band, and the AP 1 transmits a signal to each of the STAs through the antenna 105 (step S704). The control information monitoring unit 2042 of the STA reads the Group ID from the signal which is transmitted by the control channel in the data frame transmitted from the AP 1, and judges whether or not the STA participates in the OFDMA transmission (step S705). When the STA judges that the STA (here, the STA 2 to the STA 5) participates in the OFDMA transmission, the physical channel signal generation unit 2031 specifies a frequency, in which data of the STA is arranged, from the Group ID, and demodulates data addressed to the STA with a signal transmitted from the AP 1 by the data channel of the frequency (step S706). When the STA judges that the STA (here, the STA 6 to the STA 9) does not participate in the OFDMA transmission, the physical channel signal generation unit 2031 does not perform demodulation of the signal (step S707). The above is an example of the communication according to the present embodiment.

Figure 5B:
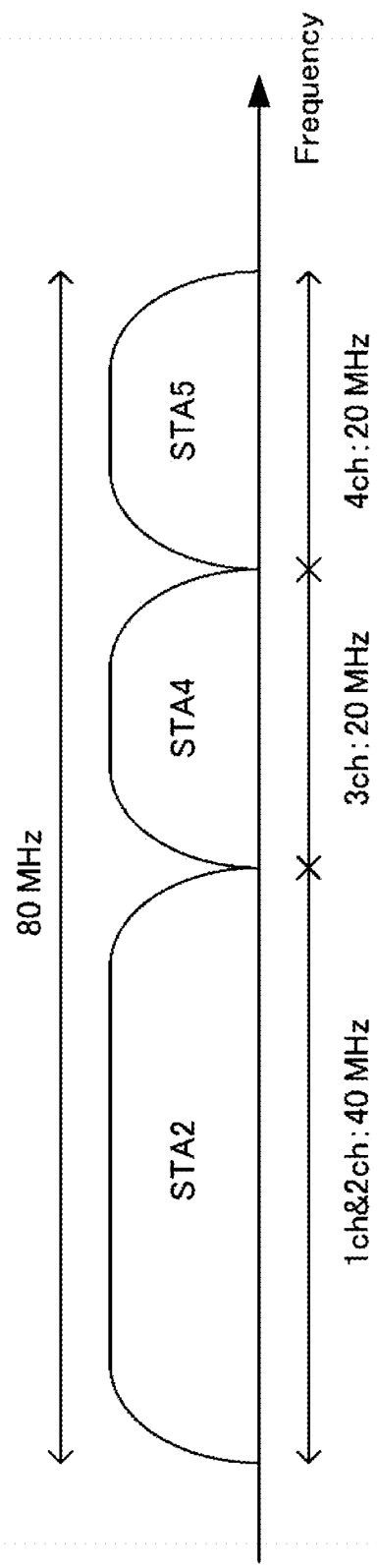
FIG. 5B illustrates an example of frequency allocation according to the first embodiment of the invention.

Note that, FIG. 5A illustrates an example in which the AP 1 allocates a bandwidth of 20 MHz equally to each of the STAs. The AP 1 according to the present embodiment is also able to allocate a frequency bandwidth unequally to each of the STAs. FIG. 5B is a schematic view illustrating another example of frequency allocation to the STA 2 to the STA 9 according to the present embodiment. The AP 1 is able to use the frequency bandwidth of 80 MHz and allocates the bandwidth of 40 MHz to the STA 2 and the bandwidth of 20 MHz to each of the STA 4 and the STA 5. At this time, the AP 1 notifies the STAs of information indicating the frequency bandwidth allocated to each of the STAs.

As the information indicating the frequency bandwidth allocated to the STA, the control signal generation unit 1033 generates information (the number of multiplexing channels) indicating how many channels are allocated with the bandwidth of 20 MHz as one channel. When the AP 1 considers frequency allocation as illustrated in FIG. 5B, the control signal generation unit 1033 may specify the number 1 as the Group ID and notify the STA 2 of 2, the STA 3 of 0, and the STA 4 and the STA 5 of 1 as the number of multiplexing channels. Since the number of multiplexing channels, which is generated by the control signal generation unit 1033, is information described in the VHT-SIG-A, the STA is also able to grasp the number of multiplexing channels allocated to other STAs.

When such control information is generated by the control signal generation unit 1033, for example, the STA 2 is able to grasp that the STA 2 participates in the OFDMA transmission, receives allocation from the first channel, and receives allocation of two channels (that is, the bandwidth of 40 MHz) in total.

On the other hand, while the STA 3 recognizes that the STA 3 participates in the OFDMA transmission, the STA 3 is able to recognize that data is not transmitted to the STA 3 because the number of multiplexing channels is 0.

The STA 4 is able to grasp that the STA 4 participates in the OFDMA transmission, is arranged in the third place, and one channel (that is, the bandwidth of 20 MHz) is allocated to the STA 4. Further, the STA 4 is also able to grasp that there are two STAs allocated to channels before that of the STA 4 and the number of the allocated channels is two (that is, the bandwidth of 40 MHz) in total. Thus, the STA 4 is able to grasp that STA 4 is allocated to the third channel with the bandwidth of 20 MHz. Similarly, the STA 5 is able to grasp that the STA 5 is allocated to the fourth channel with the bandwidth of 20 MHz.

Note that, the AP 1 is also able to notify each of the STAs in advance of a usable frequency bandwidth and a frequency thereof. In this case, the STA is able to grasp from which frequency the frequency allocation by the AP 1 is started, thus making it possible to more easily grasp the allocated frequency of the STA.

As the information indicating the frequency bandwidth allocated to the STA, the control signal generation unit 1033 may generate information directly indicating the frequency bandwidth (or the number of sub-carriers) allocated to the STA instead of the number of multiplexing channels. When the AP 1 notifies the STA of the information indicating the frequency bandwidth allocated to the STA, the value of the Group ID generated by the control signal generation unit 1033 is not always one defined value. For example, the frequency allocation as illustrated in FIG. 5B is performed, the control signal generation unit 1033 is able to send signaling of any Group ID, which indicates a group in which the STA 2, the STA 4, and the STA 5 are described in this order, to each of the STAs.

The frequency bandwidth usable by the AP 1 may be a frequency bandwidth other than 80 MHz and does not need to be always a contiguous frequency. FIG. 5C illustrates an example of frequency allocation in a case where the AP 1 is able to use the incontiguous frequency band with the bandwidth of 160 MHz in total. Here, it is assumed that the AP 1 notifies each of the STAs in advance of a usable frequency bandwidth and a frequency thereof. Also when the AP 1 performs frequency allocation as illustrated in FIG. 5C, the control signal generation unit 1033 may specify the number 1 as the Group ID and notify the STA 2 of 2, the STA 3 and the STA 4 of 1, and the STA 5 of 4 as the number of multiplexing channels.

In the schematic view of frequency allocation by the AP 1 illustrated in FIG. 5A, it is assumed that data signals addressed to each of the STAs are subjected to OFDM modulation separately. That is, the frame configuration unit 1032 of the AP 1 generates four OFDM signals each having an occupied bandwidth (here, including a guard band for suppressing out-of-band radiation) of 20 MHz and arranges each of them in the frequency allocated to each of the STAs (hereinafter, referred to as individual arrangement). In this case, the STA is required to demodulate only the OFDM signal transmitted in the frequency allocated to the STA, thus making it possible to reduce burden on demodulation of the OFDM signal by the STA.

On the other hand, the frame configuration unit 1032 of the AP 1 may generate one OFDM signal that occupies a whole of the usable frequency bandwidth (in the case of FIG. 5A, 80 MHz) (hereinafter, referred to as collective arrangement). FIG. 5D is a schematic view illustrating another example of frequency allocation to the STA 2 to the STA 5 according to the present embodiment. At this time, since the frame configuration unit 1032 allocates each sub-carrier of the generated OFDM signal to each of the STAs, the guard band for suppressing out-of-band radiation, which is required in the individual arrangement, is able to be reduced, thus making it possible to improve frequency efficiency. In this case, it is needless to say that the number of sub-carriers to be allocated to the STAs by the AP 1 may not be equal. Further, the AP 1 may perform control so as to perform the individual arrangement for a part of the frequency while performing the collective arrangement.

Whether to perform the individual arrangement or the collective arrangement by the AP 1 may be determined in advance between the AP 1 and each of the STAs or may be notified to each of the STAs by using common control information such as the VHT-SIG-A. The STA may blindly estimate whether to be the individual arrangement or the collective arrangement. For example, in the case of the individual arrangement, by measuring power of the frequency serving as the guard band, the STA is able to judge whether to be the individual arrangement (when the power of the frequency is smaller than power of other frequencies) or the collective arrangement (when the power of the frequency is equal to other frequencies). Note that, when the AP 1 performs the collective arrangement, an OFDM signal including a null sub-carrier corresponding to a carrier hole or a guard band may be generated similarly to the individual arrangement.

According to a method of the present embodiment, since the AP 1 is able to notify each of the STAs of an allocated frequency channel by using a value of the Group ID, it is possible to realize OFDMA transmission while suppressing overhead associated with the notification.

2. Second Embodiment

In the present embodiment, the AP 1 also corresponds to multiplexing transmission by MU-MIMO transmission in addition to the OFDMA transmission. Note that, an outline of the communication system, a configuration of the AP 1, and configurations of the STAs 2 to 9 in the present embodiment are the same as those of the first embodiment.

In the present embodiment, when performing data transmission simultaneously to the STAs, the higher layer unit 101 of the AP 1 judges in advance whether to perform the OFDMA transmission or the MU-MIMO transmission. A reference for changing a multiplexing transmission scheme (a multiplexing scheme, multiplexing transmission, simultaneous multiplexing transmission, an access scheme) by the higher layer unit 101 is not limited, but may be determined, for example, on the basis of reception quality of the STAs. Further, in order for the AP 1 to perform the MU-MIMO transmission, channel state information (CSI) between the AP 1 and each of the STAs is required. The AP 1 may perform control so as to perform the MU-MIMO transmission when grasping the CSI between the AP 1 and each of the STAs by control information or the like notified from the STAs and perform the OFDMA transmission when not grasping the CSI.

The control signal generation unit 1033 determines a value of the Group ID in accordance with a combination of STAs subjected to simultaneous transmission. In this case, the value of the Group ID generated by the control signal generation unit 1033 does not change between a case where the AP 1 performs the MU-MIMO transmission and a case where the AP 1 performs the OFDMA transmission. For example, in a case where the STA 2, the STA 3, the STA 8, and the STA 5 are multiplexed by the OFDMA transmission when the Group ID provided in FIG. 6 is used, the control signal generation unit 1033 specifies a number 33 as the Group ID. On the other hand, also in a case where the AP 1 multiplexes the STA 2, the STA 3, the STA 8, and the STA 5 by the MU-MIMO transmission, the number 33 is specified as the Group ID.

Note that, the higher layer unit 101 of the AP 1 may determine the multiplexing transmission scheme after determining a combination of STAs.

Since the AP 1 uses the same Group ID regardless of the access scheme, the STA needs to judge whether the STA participates in the OFDMA transmission or participates in the MU-MIMO transmission. In the present embodiment, the AP 1 is able to send signaling, which indicates whether the AP 1 performs the OFDMA transmission or the MU-MIMO transmission, to each of the STAs by control information such as the VHT-SIG-A.

Control may be performed so that, with a specific combination of data modulation schemes used in VHT-SIG-A transmission, each of the STAs judges the access scheme used by the AP 1. For example, it is determined in advance such that the AP 1 uses OBPSK (Offset binary phase shift keying) in the first OFDM symbol of the VHT-SIG-A and BPSK for the second OFDM symbol in the case of performing the OFDMA transmission, and uses the BPSK for the first OFDM symbol and the OBPSK for the second symbol in the case of performing the MU-MIMO transmission, so that the STA is able to judge whether the AP 1 performs the OFDMA transmission or the MU-MIMO transmission on the basis of power of a real part and an imaginary part of contiguous two OFDM symbols.

The CSI between the AP1 and each of the STAs is required when the AP 1 performs the MU-MIMO transmission. As a method for acquiring the CSI by the AP 1, a method for transmitting a packet called NDP (Null data packet) announcement by which the AP 1 indicates a feedback request of the CSI to each of the STAs is defined in the IEEE802.11n/ac. Thus, the STA may judge that the packet which is delivered to the STA in a fixed time period after receiving the NDP announcement is transmitted by the AP 1 by means of the MU-MIMO transmission. A value of the fixed time period may be determined in advance between the AP 1 and each of the STAs or the AP 1 may include the value in the NDP announcement. Note that, the AP may include information, which indicates that the OFDMA transmission is performed to the STA, in the NDP announcement or may notify the STA that the OFDMA transmission is performed by setting the value of the fixed time period as 0.

The STA judges whether the AP 1 performs the OFDMA transmission or the MU-MIMO transmission on the basis of the received data frame, and then judges, from the value of the Group ID, in which radio resource (frequency resource or space resource) data addressed to the STA is arranged. For example, considered is a case where the number 1 of the Group ID described in FIG. 6 is notified to the STA 3. When the AP 1 performs the OFDMA transmission, the STA 3 is able to judge that transmission is performed to the STA 3 with the second frequency resource (in the case of FIG. 5A, the second channel). On the other hand, when the AP 1 performs the MU-MIMO transmission, the STA 3 is able to judge that transmission is performed to the STA 3 with the second space resource.

Figure 8:
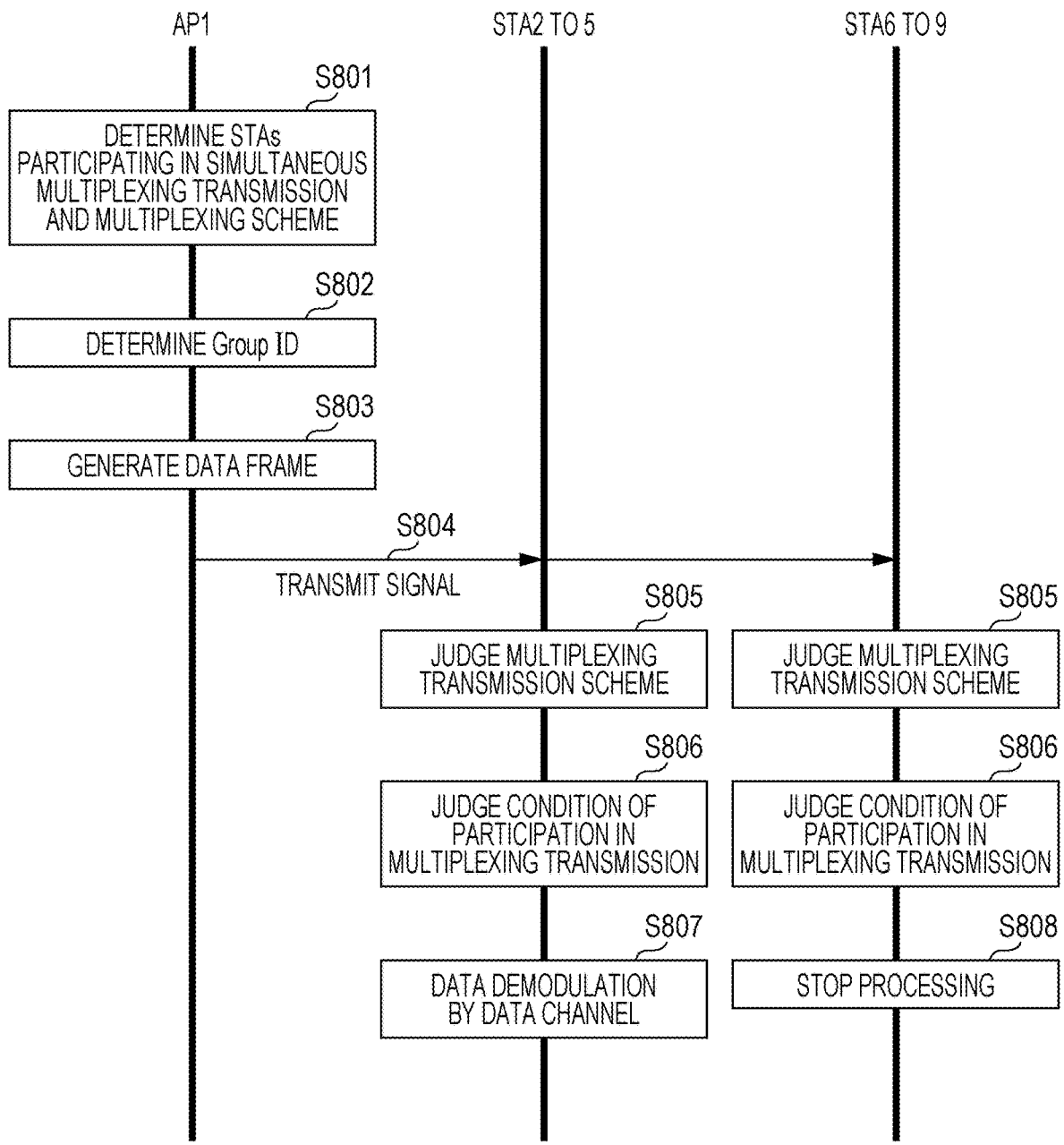
FIG. 8 is a sequence chart illustrating an example of communication according to a second embodiment of the invention.

FIG. 8 is a sequence chart indicating an example of communication according to the present embodiment. First, the higher layer unit 101 of the AP 1 determines a combination of STAs subjected to simultaneous transmission and a multiplexing scheme (OFDMA transmission or MU-MIMO transmission) to be used (step S801). The control signal generation unit 1033 of the AP 1 then determines a value of the Group ID in accordance with the combination of the STAs, which is determined by the higher layer unit 101 (step S802). Further, the frame configuration unit 1032 generates a data frame that includes control information (for example, VHT-SIG-A) including the value of the Group ID generated by the control signal generation unit 1033 (step S803). Note that, processing (for example, addition of control information, application of a specific combination of data modulation schemes) by which each of the STAs is able to judge the multiplexing scheme performed for the STA by the AP 1 is performed by the frame configuration unit 1032 for the data frame generated by the frame configuration unit 1032 according to the present embodiment. Then, the radio transmission unit 1034 generates a transmission signal in the RF band, and the AP 1 transmits the signal to the STA through the antenna 105 (step S804). The control information monitoring unit 2042 of the STA judges, from the data frame transmitted from the AP 1, a multiplexing scheme performed by the AP 1 to the STA (step S805). The control information monitoring unit 2042 then reads a Group ID from the signal transmitted by the control channel and judges whether or not the STA participates in the multiplexing transmission (step S806). When judging that the STA (here, the STA 2 to the STA 5) participates in the multiplexing transmission, the physical channel signal generation unit 2031 specifies, from the Group ID, a radio resource in which data of the STA is arranged, and demodulates data addressed to the STA with the signal transmitted from the AP 1 by the data channel of the radio resource (step S807). When judging that the STA (here, the STA 6 to the STA 9) does not participate in the multiplexing transmission, the physical channel signal generation unit 2031 does not demodulate the signal (step S808). Note that, the processing of step S805 and the step S806 may be reversed in order, and in such a case, when judging that the STA does not participate in the multiplexing transmission at step S806, the judgment of the multiplexing scheme at step S805 is able to be omitted. The above is an example of the communication according to the present embodiment.

The control signal generation unit 1033 according to the present embodiment may further generate information (for example, a frequency bandwidth or the number of multiplexing channels) indicating the number of frequency resources allocated to the STAs and information (for example, the number of streams for spatial multiplexing) indicating the number of space resources allocated to the STAs. At this time, control may be performed so that the control signal generation unit 1033 generates both the number of multiplexing channels and the number of streams for spatial multiplexing or generates only one of the information on the basis of the multiplexing transmission scheme determined by the higher layer unit 101.

When the control signal generation unit 1033 generates only one of the number of multiplexing channels and the number of streams for spatial multiplexing, the control signal generation unit 1033 may describe the information in the same bit field of control information. The control information monitoring unit 2042 of the STA is able to judge, before reading the control information, the multiplexing transmission scheme performed by the AP 1 for the STA, and is thus able to judge whether the information described in the bit field is the number of frequency resources or the number of space resources.

According to the method described above, the AP 1 is able to notify the STA of condition of resource allocation by the Group ID also in a radio LAN through which the AP 1 selectively performs the OFDMA transmission and the MU-MIMO transmission, thus making it possible to improve user throughput while minimizing an increase in overhead.

3. Third Embodiment

In the present embodiment, the AP 1 performs multiplexing transmission using the OFDMA transmission and MU-MIMO transmission simultaneously. Note that, an outline of the communication system, a configuration of the AP 1, and configurations of the STAs 2 to 9 in the present embodiment are the same as those of the first embodiment.

In the present embodiment, when performing data transmission simultaneously to the STAs, the higher layer unit 101 of the AP 1 judges in advance whether to perform the OFDMA transmission, perform the MU-MIMO transmission, or simultaneously perform the OFDMA transmission and the MU-MIMO transmission. A case where the AP 1 simultaneously performs the OFDMA transmission and the MU-MIMO transmission will be described below.

FIG. 5E is a schematic view illustrating an example of frequency allocation to the STA 2 to the STA 9 according to the present embodiment. It is assumed that the AP 1 performs multiplexing transmission for the STA 2 to the STA 5, allocates a bandwidth of 40 MHz to each of the STAs, and further spatially multiplexes the STA 2 and the STA 4 and spatially multiplexes the STA 3 and the STA 5.

The control signal generation unit 1033 determines a value of the Group ID in accordance with a combination of STAs subjected to simultaneous transmission. At this time, the value of the Group ID generated by the control signal generation unit 1033 is determined merely by the combination of STAs participating in simultaneous transmission and does not depend on condition of multiplexing of the STAs. For example, in a case where the AP 1 uses the Group ID illustrated in FIG. 6, even when the AP 1 allocates the STA 5 to the frequency, to which the STA 2 and the STA 3 are allocated, under the allocation condition as illustrated in FIG. 5E, the control signal generation unit 1033 generates the number 1 as the Group ID.

In the present embodiment, information (for example, the frequency bandwidth or the number of multiplexing channels) indicating the number of frequency resources allocated to each of the STAs is further generated. Here, the information indicating the number of frequency resources, which is generated by the control signal generation unit 1033, does not depend on the condition of multiplexing of the STAs similarly to the Group ID, and merely indicates the number of frequency resources allocated to the STAs. In the case of FIG. 5E, when the control signal generation unit 1033 notifies the number of multiplexing channels as the information indicating the number of frequency resources, values of 2, 2, 2, and 2 are respectively generated for the STA 2, the STA 3, the STA 4, and the STA 5.

In the present embodiment, the AP 1 notifies each of the STAs in advance of a usable frequency bandwidth and a frequency thereof. In the case of FIG. 5E, the AP 1 notifies the STA in advance that a frequency bandwidth of 80 MHz is usable. That is, the control signal generation unit 1033 of the AP 1 according to the present embodiment generates the Group ID, the information indicating the number of frequency resources, and the information indicating the frequency bandwidth usable by the AP 1 and the frequency thereof. Note that, since signal processing of other component devices of the AP 1 is similar to those of the first embodiment and the second embodiment, description thereof will be omitted.

On the other hand, the STA needs to judge in which data channel of a data frame transmitted from the AP 1 transmission data addressed to the STA is included and with which radio resource the data frame is transmitted. From the value of the Group ID that is included in control information transmitted by a control channel of the data frame transmitted from the AP 1, the control information monitoring unit 2042 of the STA judges whether the STA participates in multiplexing transmission. When the STA is able to judge that the STA participates in the multiplexing transmission, the STA judges the radio resource, to which the transmission data of the STA is allocated, on the basis of the information indicating the number of frequency resources included in the control information and the information indicating the frequency bandwidth usable by the AP 1 and the frequency thereof.

Here, it is assumed that the AP 1 performs resource allocation as illustrated in FIG. 5E and notifies each of the STAs that the Group ID (refer to FIG. 6) is the number 1, the number of frequency resources (the number of multiplexing channels with a bandwidth of 20 MHz as one channel) for each of the STAs is 2, and further a frequency band of 80 MHz is usable.

First, the control information monitoring unit 2042 of the STA sets two internal variables of a frequency resource counter and a space resource counter, and initializes them to 1. Then, each of the counters is increased (incremented) on the basis of the information (here, the number of multiplexing channels with the bandwidth of 20 MHz as one channel) indicating the number of frequency resources notified from the AP 1. Note that, the frequency resource counter may be controlled on the basis of the number of sub-carriers to which transmission data to the STA is allocated.

First, the STA 2 described first in the Group ID is able to judge that the transmission data addressed to the STA 2 is allocated to the bandwidth of 40 MHz from the beginning of the frequency usable by the AP 1. Since the space resource counter is 1, the STA 2 is able to judge that the transmission data addressed to the STA 2 is arranged in the first place of the space resource. At this time, the frequency resource counter of STAs arranged in other Group IDs is increased by 2.

Further, since the frequency resource counter and the space resource counter of the STA 3 are respectively 3 and 1, the STA 3 is able to judge that the frequency resource in which the transmission data addressed to the STA 3 is arranged is 40 MHz in the last half of the bandwidth of 80 MHz usable by the AP 1 and the space resource is in the first place. At this time, the frequency resource counter of STAs arranged in other Group IDs is increased by 2.

Then, the frequency resource counter of the STA 4 is 5 and is found to be exceeding the number of multiplexing channels (4 in the case of FIG. 5E) usable by the AP 1, so that the space resource counter is increased by 1 and the frequency resource counter is decreased by 4 (the number of multiplexing channels usable by the AP 1). This processing is similarly performed for other STAs. The STA 4 is able to judge that the frequency resource in which the transmission data addressed to the STA 4 is arranged is the first 40 MH of the bandwidth of 80 MHz usable by the AP 1 and the space resource is in the second place. At this time, the frequency resource counter of STAs arranged in other Group IDs is increased by 2.

Lastly, since the frequency resource counter and the space resource counter of the STA 5 are respectively 3 and 2, the STA 5 is able to judge that the frequency resource in which the transmission data addressed to the STA 5 is arranged is 40 MHz in the last half of the bandwidth of 80 MHz usable by the AP 1 and the space resource is in the second place. In this manner, the STA is able to judge the radio resource, in which the transmission data addressed to the STA is arranged, from the value of the Group ID notified from the AP 1, the information indicating the number of frequency resources, and the information indicating the frequency bandwidth usable by the AP 1. That is, the AP 1 according to the present embodiment performs processing for sequentially allocating the space resource from the first place and also the frequency resource from the first place in accordance with order of the STAs described in the Group ID, and then allocating the frequency resource to the STAs preferentially.

Note that, the AP 1 may notify the STAs in advance of the maximum number of usable space resources and perform allocation from the space resource to the STAs preferentially. That is, the STAs preferentially increase the space resource counter.

Figure 5F:
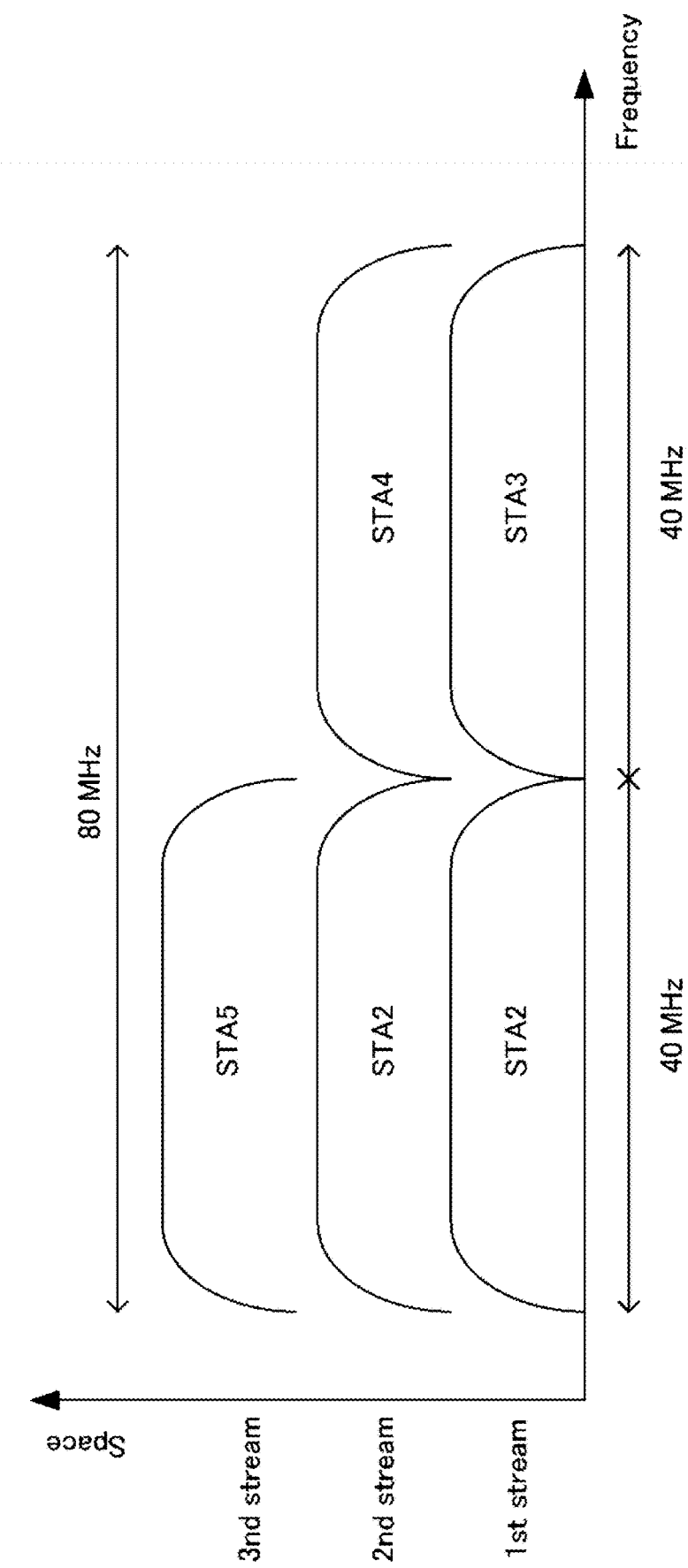
FIG. 5F illustrates an example of frequency allocation according to the third embodiment of the invention.

The AP 1 according to the present embodiment may further notify the STAs of information indicating the number of space resources allocated to the STAs. FIG. 5F is a schematic view illustrating another example of frequency allocation to the STA 2 to the STA 9 according to the present embodiment. After performing the frequency allocation similar to that of FIG. 5E, the AP 1 allocates two space resources to the STA 2. At this time, the control signal generation unit 1033 generates the number 1 as the Group ID, 2 for each of the STAs as the information indicating the number of frequency resources, and 2 for the STA 2, 3 for the STA 3, and 1 for each of the STA 4 and the STA 5 as the information indicating the number of space resources.

The control information monitoring unit 2042 of each of the STAs sets two internal variables of a frequency resource counter and a space resource counter, and when the information indicating the number of space resources is notified from the AP 1, the space resource counter is set for each frequency resource.

The STA 2 is able to judge that the transmission data addressed to the STA 2 is allocated to the 40 MHz from the beginning of the frequency bandwidth usable by the AP 1. Since the space resource counter for the frequency resource is 1, the STA 2 is able to judge that the transmission data addressed to the STA 2 is arranged from the first place to the second place of the space resource. At this time, the frequency resource counter of STAs arranged in other Group IDs is increased by 2 and the space resource counter for the frequency resource is increased by 2.

Further, since the frequency resource counter and the space resource counter of the STA 3 are respectively 3 and 1, the STA 3 is able to judge that the frequency resource in which the transmission data addressed to the STA 3 is arranged is 40 MHz in the last half of the bandwidth of 80 MHz usable by the AP 1 and the space resource is in the first place. At this time, the frequency resource counter of STAs arranged in other Group IDs is increased by 2 and the space resource counter for the frequency resource is increased by 1.

Then, the frequency resource counter of the STA 4 is 5 and is found to be exceeding the number of multiplexing channels (4 in the case of FIG. 5E) usable by the AP 1, so that the STA 4 judges that the STA 4 participates in the MU-MIMO transmission. In this case, the frequency counter of the STA 4 is reset so as to allow allocation from the frequency resource whose space resource counter is the smallest. In FIG. 5F, at a time when the STA 4 judges the radio resource allocated to the STA 4, the third and fourth frequency resources have the smallest number of space resources, so that the frequency resource counter is set to 3. Thus, the STA 4 is able to judge that the frequency resource in which the transmission data addressed to the STA 4 is arranged is 40 MHz in the last half of the bandwidth of 80 MHz usable by the AP 1 and the space resource is in the second place. At this time, the frequency resource counter of STAs arranged in other Group IDs is increased by 2 and the space resource counter for the frequency resource is increased by 1.

Further, since the frequency resource counter of the STA 5 is 5 and the space resource counter of all the frequency resources is 3, it is found that the number of multiplexing channels (4 in the case of FIG. 5E) usable by the AP 1 is exceeded, so that the STA 5 is able to judge that the frequency resource in which the transmission data addressed to the STA 5 is arranged is the first 40 MH of the bandwidth of 80 MHz usable by the AP 1 and the space resource is in the third place. In this manner, when the AP 1 notifies each of the STAs of the information indicating the number of space resources, the STA is able to judge the radio resource in which the transmission data addressed to the STA is arranged even in a case where different number of space resources are allocated to each of the STAs.

When considering the method of the present embodiment differently, it can be said that the higher layer unit 101 of the AP 1 is desired to determine allocation of the radio resource to the STA so that the STA is able to judge the radio resource, to which the transmission data addressed to the STA is allocated, from the two internal variables of the frequency resource counter and the space resource counter provided in the control information monitoring unit 2042 of the STA and the control information notified by the control signal generation unit 1033.

Note that, in the present embodiment, though the control information monitoring unit 2042 of the STA judges the radio resource, in which the transmission data addressed to the STA is arranged, by using the internal variables called the frequency resource counter and the space resource counter, a method for judging the radio resource by the control information monitoring unit 2042 is not limited thereto as long as an equivalent effect is achieved.

According to the method of the present embodiment, the AP 1 is able to apply, by using the Group ID, the multiplexing transmission simultaneously using the OFDMA transmission and the MU-MIMO transmission to the STAs, so that it is possible to improve user throughput while suppressing overhead associated with notification of control information.

4. Common in all Embodiments

Note that, a program which runs in the radio transmission apparatus and the radio reception apparatus according to the invention is a program that controls a CPU and the like (program that causes a computer to function) such that the functions in the aforementioned embodiments concerning the invention are realized. The pieces of information handled by the apparatuses are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the aforementioned embodiments are realized, but also by performing processing in cooperation with an operating system, other application programs or the like based on an instruction of the program, the functions of the invention are realized.

When being distributed in the market, the program is able to be stored in a portable recording medium and distributed or be transferred to a server computer connected through a network such as the Internet. In this case, a storage apparatus of the server computer is also included in the invention. A part or all of the radio transmission apparatus and the radio reception apparatus in the aforementioned embodiments may be realized as an LSI which is a typical integrated circuit. Each functional block of a radio transmission apparatus or a radio reception apparatus may be individually formed into a chip, or a part or all thereof may be integrated and formed into a chip. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the aforementioned embodiments. The radio reception apparatus of the present application is not limited to be applied to a mobile station apparatus, but, needless to say, is applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiments of the invention have been described in detail with reference to drawings, but specific configurations are not limited to the embodiments, and a design and the like which are not departed from the main subject of the invention are also included.

INDUSTRIAL APPLICABILITY

The invention is suitably used for a radio transmission apparatus, a radio reception apparatus, and a communication method.

Note that, the present international application claims priority from Japanese Patent Application No. 2014-107650 filed on May 26, 2014, and the entire contents of Japanese Patent Application No. 2014-107650 are hereby incorporated herein by reference.

REFERENCE SIGNS LIST

1 AP
2, 3, 4, 5, 6, 7, 8, 9 STA
101, 201 higher layer unit
102, 202 control unit
103, 203 transmission unit
104, 204 reception unit
105, 205 antenna
1031, 2031 physical channel signal generation unit
1032 frame configuration unit
1033 control signal generation unit
1034, 2032 radio transmission unit
1041, 2041 physical channel signal demodulation unit
1042, 2043 radio reception unit
2042 control information monitoring unit

What is claimed is:

1. An access point (AP) apparatus configured to transmit data addressed to a plurality of station (STA) apparatuses, the AP apparatus comprising:
   control circuitry configured to set a frequency allocation of a plurality of frequency allocations;
   control signal generation circuity configured to generate first control information indicating bandwidth and placement in frequency domain, and second control information indicating the plurality of STA apparatuses; and
   transmission circuity configured to generate a frame including the first control information and the second control information, and perform transmission of the frame; wherein
   the placement in the first control information and an order of the plurality of the STA apparatuses that is indicated by the second control information together identify a frequency resource used to transmit data of the plurality of STA apparatuses; and
   the frame includes a training field that provides a means for the STA apparatus to estimate a channel.

2. The AP apparatus according to claim 1, wherein the first control information includes a size of the frequency resource.

3. The AP apparatus according to claim 2, wherein the size of the frequency resource is the number of sub-carriers of the frequency resource.

4. A station (STA) apparatus that receives a signal that is transmitted from an access point (AP) apparatus, the STA apparatus comprising:
   reception circuitry configured to receive a frame including a first control information indicating bandwidth and placement in frequency domain, and a second control information indicating a plurality of STA apparatuses, and the signal in which transmission data addressed to the plurality of STA apparatuses is multiplexed; and control information monitoring circuitry configured to identify a frequency resource and transmission data addressed to the STA apparatus based on the first control information and the second control information; wherein an order of the plurality of STA apparatuses that is indicated by the second control information is identical to an order of the plurality of frequency resources that is indicated by the first control information; and the frame includes a training field that provides a means for the STA apparatus to estimate a channel.

5. The STA apparatus according to claim 4, wherein the first control information includes a size of the frequency resource.

6. The STA apparatus according to claim 5, wherein the size of the frequency resource is the number of sub-carriers of the frequency resource.

7. A communication method of an access point (AP) apparatus configured to transmit data addressed to a plurality of station (STA) apparatuses, the communication method comprising:

setting a frequency allocation of a plurality of frequency allocations;

generating first control information indicating bandwidth and placement in frequency domain, and second control information indicating the plurality of STA apparatuses; and generating a frame including the first control information and the second control information, and performing transmission of the frame; wherein the placement in the first control information and an order of the plurality of the STA apparatuses that is indicated by the second control information together identify a frequency resource used to transmit data of the plurality of STA apparatuses; and the frame includes a training field that provides a means for the STA apparatus to estimate a channel.

\* \* \* \* \*